UNITED STATES PATENT OFFICE.

WAITSTILL H. SWENARTON, OF MONTCLAIR, NEW JERSEY.

PROCESS OF MAKING ARSENATE INSECTICIDES.

1,418,848.  Specification of Letters Patent.  Patented June 6, 1922.

No Drawing.  Application filed December 10, 1919. Serial No. 343,828.

*To all whom it may concern:*

Be it known that I, WAITSTILL H. SWENARTON, of Montclair, in the county of Essex and State of New Jersey, have invented new and useful Improvements in Processes of Making Arsenate Insecticides, of which the following is a specification.

This invention relates to the manufacture of insecticides of the arsenate type and especially lead arsenate and has for its principal objects the expeditious and economical production of a product which may be either mixed with water and used as a spray in the manner that lead arsenate is now applied on apple trees, or dusted on the foliage and blossoms as arsenate insecticide is now employed in the cotton fields in suppressing the boll weevil.

It is well known in the art that when a water solution of an alkali-metal salt, such for example as a sodium arsenate, preferably sodium acid arsenate ($Na_2HAsO_4$), reacts with a solution of lead nitrate (or lead acetate), double decomposition occurs and insoluble lead arsenate and soluble sodium nitrate (or acetate) are produced. In practice, it has been customary to produce the sodium arsenate employed in such a process by the separate fusion in a retort of a suitable alkali-metal compound with arsenic oxid. Moreover in those cases where the sodium nitrate or acetate produced as a by-product in manufacturing the lead arsenate by such double decomposition method was not discarded, it was either sold as such or, in certain instances, attempts were made to produce lead nitrate or lead acetate therefrom by a fusion with suitable lead compounds. Such fusion, however, produces as a by-product caustic soda which was a decidedly objectionable product to handle and which, unless it were possible for the producer to consume the same, could not always be profitably marketed.

My inventions have led to the discovery of a simple and efficient cyclic method of manufacturing insoluble arsenate insecticides by a double decomposition method wherein relatively large quantities of sodium compounds are produced as by-products and in turn are utilized in their entirety, without expensive and separate fusion treatment thereof being required, in order to produce further quantities of the desired arsenate insecticide.

My process will be described with especial reference to the manufacture of lead arsenate though obviously, without departing from the spirit of my invention, the same may be employed for making other insoluble arsenates, as for example calcium arsenate.

As an example of the method of carrying out my invention, I will now describe the production of lead acid arsenate ($PbHAsO_4$) by my improved method:

Sodium acetate (or nitrate), prepared by the action of the appropriate acid upon soda ash in the well known manner, is dissolved in a relatively large quantity of water and a chemical equivalent weight of litharge, either the ordinary fumed or air floated variety, is then stirred into such solution and agitated until evenly suspended therein. The amount of water should be such that the total solid contents, both soluble and insoluble, of the solution is about 15% by weight.

To insure against the alkalinity of the mass, at the end of the precipitation, a small amount of acetic (or nitric) acid, say $\frac{1}{2}\%$ by weight of the solid contents of the solution, is then added, though without departing from the spirit of my invention, this acidifying may be dispensed with, as while preferable it is not essential in view of the large quantity of acetic (or nitric) acid generated in the process as hereinafter set forth.

To the foregoing mixture is then slowly added, with constant agitation, the chemical equivalent weight of a 15% solution of arsenic acid required to convert the sodium salt to sodium acid arsenate ($Na_2HAsO_4$), the flow of such acid into the mixture being so regulated as to be equivalent to a period of from 4 to 5 hours when operating in large batches of about 3,000 lbs.

Preferably the temperature of the mass is maintained at least up to about 70° C. though this is not essential to the success of the operation as the reaction heat itself is sufficient to yield excellent results. The precipitated lead acid arsenate obtained from the foregoing treatment is filtered off, washed and dried.

A desirable filtering apparatus for this purpose is comprised of a battery of filters so interconnected that the inlets and outlets thereto can be shifted at will in order that the effluent from the first one will constitute the wash water of a second and the effluent of the second will constitute the inflowing wash water of a third, etc., depending upon the number of filters employed and the order of emptying of each filter will progressively shift so that the filter which temporarily is receiving the fresh water will be the one that is the most thoroughly washed and the one to be first emptied. Immediately after emptying a filter the connections are rearranged so that as soon as this filter is supplied with fresh material to be washed it will become the last of the series and each of the other filters will be advanced one place in the order of procedure, the second becoming the first and the third becoming the second, etc. In this manner, particularly when using a pressure type of filter, it becomes possible to wash precipitated lead arsenate substantially free from the relatively large quantities of soluble salts originally contained therein and even down to but a fraction of a per cent with an amount of water equal to less than the weight of the precipitate or cake removed from a particular unit of the battery.

The cycle of operations is then repeated by mixing the filtrate, from the foregoing operation, comprising either sodium acetate (or sodium nitrate) together with a slight excess of acid, if the same has been used to acidulate the same, as above described, with additional litharge and then feeding additional arsenic acid to the mixture. However, if preferred the filtrate of sodium acetate (or nitrate) may be concentrated, preferably by means of vacuum driers adapted to concentrate salt solutions, and a solution of arsenic acid in sufficient quantity to correspond to the chemical equivalent required to react therewith and form sodium acid arsenate is then added. The degree of concentration of the filtrate should be such that when the aforesaid quantity of say a 12% solution of arsenic acid is added the dilution will be about 14 parts of sodium acid arsenate and acetic acid combined to 100 parts of water. A fresh batch of litharge, either of the ordinary type or the fumed or air floated type, is then suspended in water, for example in proportions of about 14 parts of litharge to 100 parts of water and the foregoing sodium acid arsenate—acetic acid—mixture is added while maintaining a rate of flow corresponding to that above set forth.

The essential reactions in my process are believed to be represented by the following:

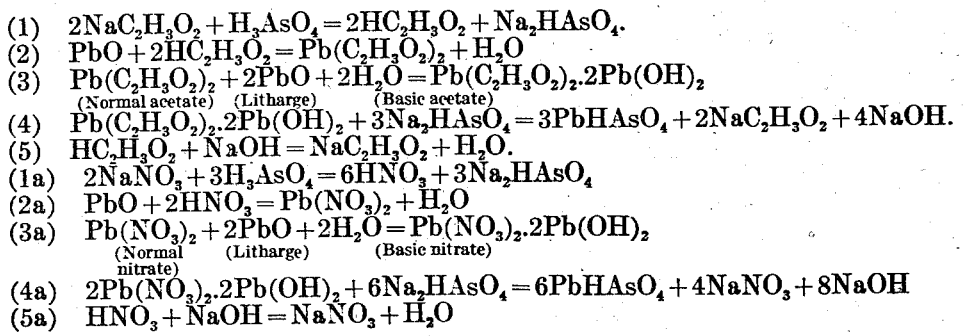

While I am aware that in so far as the reactions are concerned there is virtually no difference between my double decomposition method and the ordinary well known double decomposition method such as described in the Hall Patent No. 1,064,039, since at the moment of precipitation of the lead arsenate there is sufficient acetic or nitric acid present in the solution employed to theoretically combine with all the lead oxid reacted upon and form lead acetate or lead nitrate (as can be readily proven by separating the sodium acid arsenate from the solution employed and utilizing the acetic acid recovered to dissolve a corresponding quantity of litharge to that employed in the foregoing process), nevertheless, by means of my novel procedure it is possible to produce lead arsenate of high purity and quality at a very large saving of expense both in time, labor, materials and apparatus.

In the event that the sodium salt obtained from the operation of the process becomes contaminated with impurities, the same can either be purified by concentration of the mother liquor containing same and the desired sodium salt can be recovered therefrom by crystallization in a relatively pure state, while the volatile monobasic acid liberate can be collected and then both products mixed together and utilized again in performing a further cycle.

It is easily possible by my process to obtain a product of high purity, light, fluffy, readily emulsifiable in water, highly adhesive to foliage, easy to spray through a fine nozzle and free from alkalies, free arsenic, acids or other objectionable impurities.

Having thus described my invention, what I claim and desire to secure by Letters Patent of the United States is:

1. The process of making an insoluble arsenate of an insoluble-hydroxide-forming metal, which consists in mixing an alkali-metal salt of a monobasic acid with sufficient arsenic acid to at least convert the major portion of such salt into a soluble arsenate, and causing a compound of an insoluble-hydroxide-forming metal to react with the reaction products of such mixture, removing the insoluble arsenate obtained and repeating the cycle of operations utilizing the resultant filtrate.

2. The process of making a lead arsenate, which consists in causing chemical equivalents of a lead compound, including lead oxid in its composition, and an arsenate of sodium in solution in water to interact in the presence of sufficient monobasic acid to at least combine with at least the greater part of the sodium radical of said arsenate, then separating the insoluble lead arsenate from the soluble sodium salt and subjecting a further quantity of lead oxid in suspension in water to the action of a solution containing the reaction products produced by mixing arsenic acid with such sodium salt separated from such precipitate.

3. In the process of making an insecticide, the step which consists in subjecting lead oxid in suspension in water to the action of a combining weight of a monobasic acid, subjecting the resultant lead compound at the moment of formation to the action of a combining weight of an alkali-metal arsenate, removing the insoluble lead arsenate from the mixture and then adding sufficient arsenic acid to the soluble reaction products of said mixture to at least be capable of converting substantially all of the sodium radical into a sodium arsenate.

4. In the process of making arsenate of lead the steps which consist in causing a solution containing sufficient arsenate and sodium ions to approximate the proportions of the same in lead acid arsenate to react with an aqueous mixture including lead oxid in suspension in the presence of sufficient monobasic, water-soluble-lead-salt-forming acid to substantially neutralize any caustic soda as formed in such reaction, removing the insoluble lead arsenate obtained in the reaction from the water-soluble products, and then reutilizing substantially all of the solid contents of the water-soluble residue for the manufacture of additional lead arsenate by adding sufficient arsenic acid to convert the sodium content thereof into sodium arsenate, and then causing the reaction products of this latter operation to come into contact with lead oxide in suspension.

5. The process of making lead arsenate, which consists in first forming an alkali-metal salt of a monobasic acid and subsequently causing the ions of such salt and of arsenic acid to react upon an oxy-lead compound, separating the insoluble arsenate obtained, recovering the resultant soluble alkali-metal salt of a monobasic acid separately from such arsenate and reutilizing the latter salt in the production of more lead arsenate by again causing the ions of such salt and of additional arsenic acid to react upon a fresh supply of an oxy-lead compound.

Signed at the city, county and State of New York this 9th day of December, 1919.

WAITSTILL H. SWENARTON.